United States Patent [19]
Stengel et al.

[11] 3,867,655
[45] Feb. 18, 1975

[54] SHAFTLESS ENERGY CONVERSION DEVICE

[75] Inventors: Rudolph F. Stengel; Linda F. Stengel, both of Woodland Hills; Howard Assel, Laguna Beach, all of Calif.

[73] Assignee: Entropy Limited, Toronto, Ontario, Canada

[22] Filed: Nov. 21, 1973

[21] Appl. No.: 417,950

[52] U.S. Cl. .................... 310/66, 417/349, 415/55, 290/54, 290/43
[51] Int. Cl. ............................................. H02k 7/00
[58] Field of Search ......... 417/349; 415/55; 310/66, 310/67; 290/54, 4

[56] References Cited
UNITED STATES PATENTS

| | | | |
|---|---|---|---|
| 2,554,191 | 5/1951 | Huber | 310/66 X |
| 2,988,326 | 6/1961 | Wise | 415/55 |

*Primary Examiner*—G. R. Simmons
*Attorney, Agent, or Firm*—George H. Riches

[57] ABSTRACT

This invention relates to an energy conversion device which may be selectively operated in the pump mode for converting electrical energy into fluid energy or in the generator mode for converting fluid energy into electrical energy. The improved device has a hollow toroidal body with a central axis on which are located opposed inlet and outlet openings. Enclosed in the body on the central axis between the openings are a coil circle, a rotatable circular rotor having an impeller with a number of radial blades fixed thereto, and a fixed circular diffuser having a number of spaced radial vanes secured thereto. The coil circle is formed of a number of electromagnetic coils which are connected to an electrical power supply in the pump mode to produce a travelling electromagnetic wave which rotates about the central axis and cuts radial spokes of the rotor. The fluid flow path through the device in either mode begins with an axial portion, then a radial outward portion, a radial inward portion, and ends with a second axial portion along the same axis as the first axial portion. The components of the device are formed to provide that the radial portions of the flow path are substantially semicircular wherein the efficiency of the device is substantially constant over a wide range of variations in speed and capacity.

9 Claims, 6 Drawing Figures

3,867,655

SHAFTLESS ENERGY CONVERSION DEVICE

BACKGROUND OF THE INVENTION

This invention relates to a reversible energy conversion device for selectively converting electrical energy into fluid energy (pump mode) or converting fluid energy into electrical energy (generator mode). In the past, such energy conversion has been provided in the pump mode by supplying electrical energy to an electric motor, converting therein the electrical energy into mechanical energy available at the motor shaft, connecting such shaft to the impeller of a pump, and converting thereby mechanical energy into fluid energy. Also provided in the prior art are devices commonly known as motor pumps wherein a pump impeller is driven directly by electromagnetic means, without the intermediate agency of a mechanical shaft. The present device is of an improved design to operate optionally in a generator mode and as such is referred to by the term "shaftless energy conversion device."

SUMMARY OF THE INVENTION

A principal object of this invention is to provide an improved shaftless energy conversion device which is optionally operable for conversion of electrical energy into fluid energy (pump mode) or conversion of fluid energy into electrical energy (generator mode).

A further object is to provide an energy conversion device which can be inserted in a fluid line without altering the direction of the fluid line, and which does not require means to reduce leakage into, or out of, the device at the periphery of a rotating shaft.

A further object is to teach an impeller and diffuser design whose efficiency does not vary substantially with impeller speed.

A further object is to provide a shaftless energy conversion device particularly suited to minimize the volume and overall dimensions of such a device.

A further object is to provide a general design of a shaftless energy conversion device adaptable specifically to purely radial flow, axial, flow, or any fluid flow pattern intermediate thereof.

A further object is to provide, in the case of purely or predominantly radial flow, a combination of impeller and diffuser design which minimizes the changes in the velocity and direction of fluid flow through the energy conversion device.

These and other objects and advantages of the present invention will become more apparent when considered in view of the following detailed description and drawings, in which.

Figure 1:
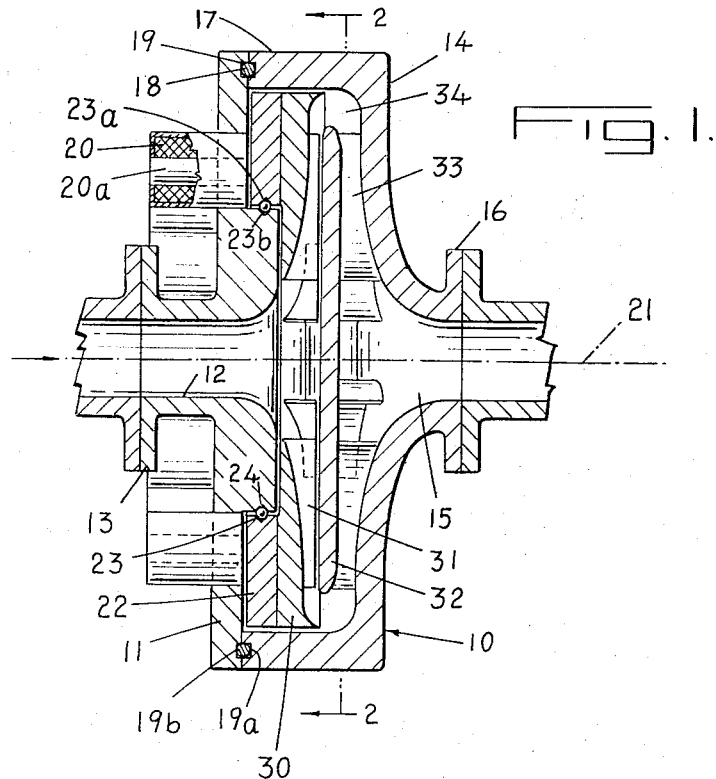
FIG. 1 is a partial axial sectional view of a shaftless energy conversion device according to a first embodiment of the invention having radial variations in impeller blade and diffuser vane heights in accordance with theory set forth in the appendix to this disclosure.

Referring to the drawings and particularly FIG. 1, we have shown therein a preferred embodiment of the invention operating in pump mode with substantially radial flow. A hollow toroidal body 10 is formed by a bottom cover part 11 including an inlet tube 12 and flange 13 for connection to an inlet fluid line; a top cover part 14 including an outlet tube 15 and flange 16 for connection to an outlet fluid line, and a perimeter wall 17. The bottom cover part 11 is attached to the perimeter wall 17 by bolts (not shown) and an O-ring 18 or other suitable sealing gasket is received in groove 19 formed by cooperating semi-grooves 19a, 19b in bottom cover part 11 and perimeter wall 17.

Bottom cover 11 supports electromagnetic drive coils 20a with cores 20b having axes parallel to the main symmetry axis 21 of the device, and being arranged equidistantly from each other on a circle (hereinafter referred to as coil circle) about said main axis. The coils are connected by wiring (not shown) e.g. to a single-phase a-c power supply (not shown) in the following manner. Let $(a,b,c,d)$ designate four successive coils along the coil circle. Then coils $(a)$ and $(b)$ are connected to the power supply in one polarity, while coils $(c)$ and $(d)$ are connected to the power supply in the opposite polarity. Between coils $(a)$ and $(c)$ and the power supply, a capacitor is interposed, while coils $(b)$ and $(d)$ are connected to the power supply directly. We then have the following wiring scheme:

coils $a$ connect to (+/−) through capacitor and have 0° phase coils $b$ connect to (+/−) directly and have 90° phase coils $c$ connect to (−/+) through capacitor and have 180° phase coils $d$ connect to (−/+) directly and have 270° phase As may be seen, the coils come in groups of four; after that, the pattern simply repeats. The number of coil groups determines directly the rate at which the electromagnetic wave travels. Taking a 60 Hz a-c supply, and one group, the wave phase evidently repeats itself at a given coil 60 times per second, and in the same time shifts also successively through the four coils of the group; hence, the wave frequency is again 60 cycles. For two groups, the wave gets only halfway around the circle in the same time, and has a frequency of 30 cycles; for three coil groups (a total of twelve as shown), the frequency is 20 cycles per second or 1,200 rpm.

It will be appreciated that this circuit arrangement causes an electromagnetic wave to orbit around the coil circle in the direction from $(a)$ to $(d)$.

Directly above the coils, a circular rotor 22 described in more detail below, is disposed to be driven by interaction with said electromagnetic wave. Rotor 22 is supported on a ball bearing 23 formed by cooperating semi-grooves 23a, 23b in rotor 22 and bottom cover 11, which serve as outer and inner races, respectively, for bearing balls 24 made, for example, of stainless steel. In lieu of a cage, balls 24 are spaced circumferentially by slightly smaller spaced balls (not visible in FIG. 1). It will be appreciated that this particular bearing design, although found practicable, could be replaced for example by a journal, magnetic, hydrodynamic or hydrostatic bearing. The rotor 22 is spaced from the bottom cover part 11 and perimeter wall 17 a sufficient distance to permit the rotor 22 to rotate freely within the body 10.

Figure 4:
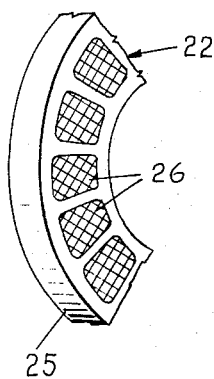
FIG. 4 is a partial perspective view of a rotor suitable for asynchronous operation in pump mode.

In one embodiment suitable for operating the device in asynchronous operation in pump mode, rotor 22 (as seen in FIG. 4) consists of an annular copper disc 25 perforated by cutouts 26 to form an inner ring and an outer ring connected by radial spokes. The cutouts 26 are filled with ferromagnetic material so as to enhance the electromagnetic fields induced in rotor 22 by the electromagnetic wave orbiting around the coil circle.

Figure 5:
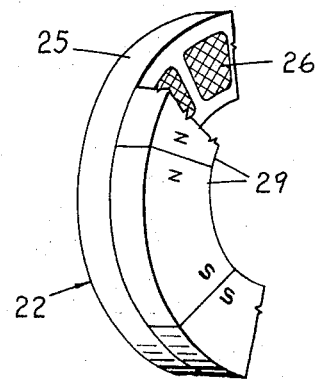
FIG. 5 is a partial perspective view of a rotor incorporating permanent magnets and suitable for synchronous operation in either pump mode or generator mode.

In an alternate embodiment, suitable for operating the device in pump mode or in generator mode, a rotor 22 (as seen in FIG. 5) contains, in addition to the annular copper disc 25 and ferromagnetically filled cutouts 26 (corresponding functionally to the copper disc and cutouts in FIG. 4), a set of permanent magnets 29, having their magnetic axes disposed in a generally circumferential direction relative to disc 25, and having alternating magnetic polarities. The number of such magnets 29 is evidently related to the number of drive coils 20. In the preferred embodiment with 12 drive coils, the electromagnetic wave generated therein then exhibits, in equidistant spacing, three N poles and three S poles; wherefore a total of six permanent magnet members 29 are required. In the pump mode, disc 25 will function upon startup as an asynchronous rotor until it reaches nearly synchronous speed, at which point, the permanent magnets 29 will lock into the electromagnetic wave and attain synchronous speed. In the generator mode, the fluid causes (in a manner explained below) rotor 22 to rotate relative to coils 20, whereupon the poles of permanent magnet members 29 induce an alternating current in the coils.

Figure 2:
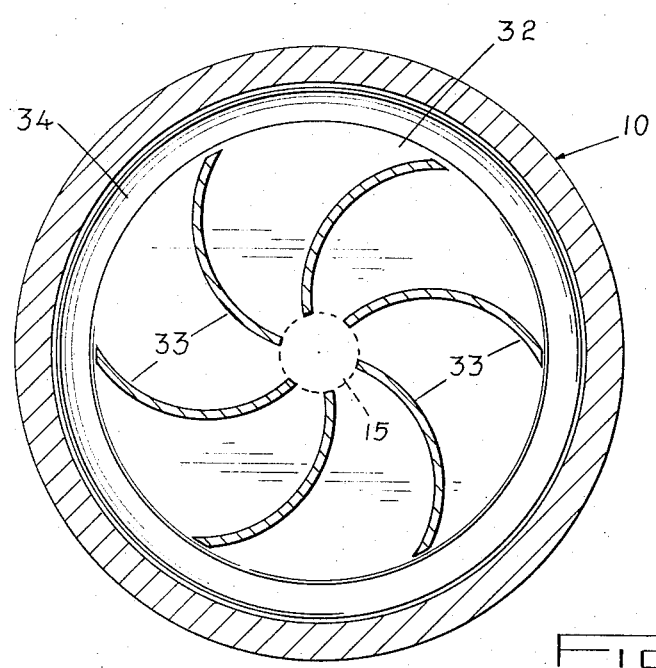
FIG. 2 is a schematic exploded view of certain parts (inlet, impeller, diffuser and outlet sections) of the device shown in FIG. 1 operating in pump mode with substantially radial flow, showing the path of a fluid particle therethrough.
Figure 3:
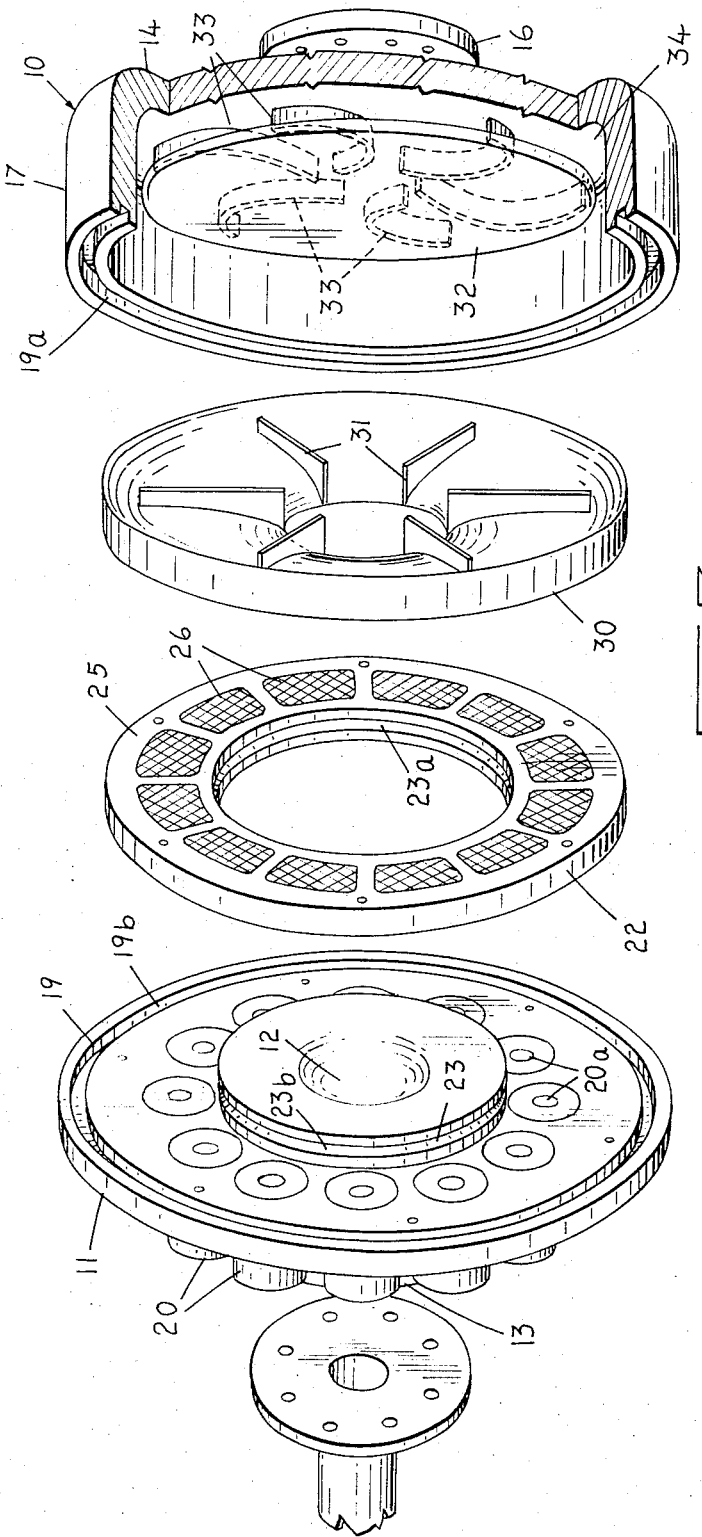
FIG. 3 is a schematic exploded view of the device shown in FIG. 1.

Returning now to FIG. 1, an impeller plate 30 having a number of straight radially extending impeller blades 31 is fixed to rotor 22. While the plate 30 is sufficiently spaced from the perimeter wall 17 to permit it to rotate, the outer ends of the blades 31 do not necessarily extend to the perimeter of plate 30. Spaced above blades 31, a stationary separator plate 32 is fixed to top cover 14 by radial diffuser vanes 33, which are semicircular in plan view, as seen in FIGS. 2 and 3.

The separator plate 32 and diffuser vanes 33 are somewhat smaller in diameter than impeller plate 30 to provide contoured perimeter space 34 between them and perimeter wall 17.

In pump mode, the device functions as follows. Electrical energy, supplied to coils 20 in a manner described above, causes an electromagnetic wave to orbit around the coil circle. By electromagnetic interaction with said wave, rotor 22 is made to rotate at (or, in the case of an asynchronous rotor as in FIG. 5, nearly at) the same angular velocity as the wave. The interior of the device (comprising the spaces within inlet tube 12, between impeller blades 31, within perimeter space 34, between diffuser vanes 33, and within outlet tube 15) is filled with fluid. Impeller blade rotation generates a centrifugal field, which in turn causes the fluid to flow through the device from inlet tube to outlet tube, and to gain static pressure in the process. In generator mode, the fluid flow pattern remains the same as in pump mode, except that the flow direction at every point within the device is reversed, as is the direction of rotation of the rotor and impeller.

It is appropriate at this point to explain more fully the specific shape of impeller and diffuser flow passages, as shown in FIG. 1. As is well known, any change in the velocity or direction of a rear fluid tends to be associated with irreversible losses of available fluid energy. As set forth in more detail in the appendix, in the preferred embodiment the velocity of the fluid exhibits substantially no changes at all, and the direction of fluid flow undergoes only the minimum number and severity of changes along the fluid flow path. Specifically, in either mode these are (as best seen in FIG. 2): first, a change from axial to radial-outward flow; second, a change from radial-outward to radial-inward flow (with a transient axial-flow component to accomplish the transition); and third, a change from radial-inward to axial flow. As is also evident from inspection of FIG. 2, the ideal path of a single fluid particle through the device, as seen along the main symmetry axis, is a circle having one-half the inside diameter of the perimeter wall, and being tangent to both the inside of the perimeter wall and to the center axis of the device. (For illustrative convenience, only a few impeller blades and stator vanes are shown in FIG. 2).

This flow path geometry has a particularly beneficial effect during startup or during operation at variable impeller speed. In conventional rotating fluid machinery (other than purely axial-flow equipment), the angle of diffuser (or, in the generator mode, stator) vanes at the impeller (or rotor) periphery, relative to a radial ray, has some value between 0° and 90°, since the fluid at that point has typically both a radial and a tangential component. It follows directly that such vanes are implicitly designed for a particular impeller (or rotor) speed, and become comparatively less efficient at different speeds. In the present invention, the fluid has substantially purely tangential velocity at the impeller (rotor) periphery, and the diffuser (stator) vane angle, if extended to the inside of the perimeter wall 17, is zero. This eliminates the effect of rotational velocity on vane efficiency, and a device according to the present invention is operable over a wide range of rotational velocities while retaining the same fluid flow geometry. Although the preferred embodiment includes a single-frequency asynchronous drive, there are means, particularly solid-state power conditioners, well known in prior art to convert a given d-c or a-c supply into a modified a-c supply of selectable and variable frequency and amplitude, whereby a device according to the present invention can be operated at variable rotational velocity, so as to accommodate desired variations in throughput and pressure change.

Figure 6:
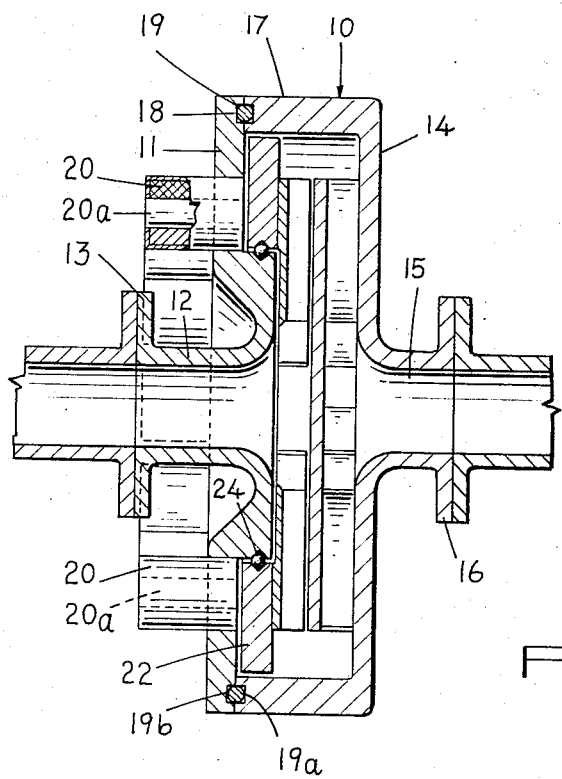
FIG. 6 is a partial axial sectional view of a shaftless energy conversion device according to a second embodiment of the invention having constant impeller blade and diffuser vane heights.

As may be seen in the preferred embodiment shown in FIGS. 1 – 3 the various parts are contoured and the impeller blades 31 and diffuser vanes 33 of correspondingly varying height to provide this preferred fluid flow path through the device. However, FIG. 6 shows a second embodiment in which, for simplicity and economy of manufacture, the impeller plate 30 and body 10 are not so contoured and the impeller blades 31 and diffuser vanes 33 are of constant height. This embodiment departs from the constant fluid velocity doctrine provided in the preferred embodiment in a direction of locally reduced (rather than enhanced) fluid velocities.

This completes the description of the embodiments of the present invention exemplifying the case of purely radial flow. However, according to well established engineering doctrine, there occurs in the optimal design of rotational fluid devices a continuous transition from purely radial to purely axial fluid flow direction (disregarding, as is customary, the presence of tangential fluid flow directions), as a function of "specific speed," a non-dimensional parameter relating the desired values of throughput rate and pressure gain (or drop). It will be apparent to anyone skilled in the art that the general design concept underlying the preferred embodiment may be adapted readily to other embodiments having (for example) mixed radial/axial flow without departing from the spirit and scope of the invention, by adding appropriate axial components to the purely radial direction of flow passages in the impeller and diffuser sections. This unavoidably increases, of course, the ratio of overall length to overall diameter of the device.

APPENDIX

Within an impeller and diffuser section of maximum radius $r_o$, let polar coordinates $(r, \theta)$ designate the position of a fluid particle at any time. We constrain the particle to a trajectory whose projection into a plane normal to the device axis is a circle of radius $(r_o/2)$ tangent to both the center and the perimeter of a circle $r = r_o$; and specify further that the absolute velocity of the particle shall remain constant on such trajectory. Thus, $r = r_o \cos(\theta)$. Also, letting $u$ and $v$ designate the tangential and absolute radial velocity of the particle, we require $u^2 + v^2 = $ const. Given a constant impeller angular velocity $\omega$, and $\theta = \omega t$, we obtain directly $u = r\omega = r_o \omega \cos(\theta)$ and $v = dr/dt = r_o \omega \sin(\theta)$; whence, by inspection, the requirement $u^2 + v^2 = $ const. is met. Since the fluid evidently has no tangential velocity relative to the impeller, the height $h$ of the fluid passage must vary as $1/r$ from an inlet radius $r_i$ to a radius $r_e$ designating the impeller perimeter. Given $r_i$, $v_i$ and a fluid volume rate $Q$, we have $h_i = Q/2\pi r_i v_i$, and $h/h_i = r_i/r$.

In moving from $r_i$ to $r_e$ in a centrifugal field, and in a flow passage having constant cross-section, the fluid gains static pressure p according to $(\frac{1}{2})\rho\omega^2 (r_e^2 - r_i^2) = P_e - P_i$, where P is the fluid mass density (treated here as a constant). Passing now to the diffuser section, we provide there vanes describable by semicircles $r = r_o \cos(\theta)$. In the diffuser section, the fluid does not experience an external centrifugal field, nor are there any means for exchange of angular momentum with an external agency, such as moving impeller blades. Assuming further that the requirement of constant absolute fluid velocity is again observed, the fluid therefore preserves the static pressure gain achieved in the impeller. However, the variation in passage height necessary for constant-velocity flow is now different from the simple inverse-radius law applicable to the impeller. In a flow field defined by a set of semicircular vanes, whose semicircles are tangent to both the diffuser perimeter and the diffuser center, the fluid passage width normal to the local flow direction can be shown to be $s = r_o(2)^{1/2}[1 - \cos(4\theta)]^{1/2}$, where the angle $\theta$ parametrically defines the radial fluid position. The required passage height $h$ then results by continuity from $h = Q/sw$ (with $w$ denoting the absolute and constant fluid velocity, as defined e.g. by $r_o\omega$), whence $h = Q/r_o^2\omega(2)^{1/2}[1 - \cos(4\theta)]^{1/2}$. Since the term $[1 - \cos(4\theta)]^{-1/2}$ tends to infinity as $r$ tends to either $r_o$ or zero, it is necessary to terminate the vane semicircle somewhat short of $r = r_o$. Fortunately the function exhibits a flat and extended minimum, and rises steeply only as $r$ approaches $r_o$ within, say, 10 per cent.

The embodiments of the invention in which an exclusive property or privilege is claimed are defined as follows:

1. An energy conversion device adapted to selectively convert fluid pressure energy into electrical energy in a generator mode and electrical energy into fluid pressure energy in a pump mode, the device having a hollow toroidal body with first and second opposed openings located on a common central axis, the body enclosing the following elements located on the central axis in parallel planes extending perpendicular to the central axis in the following order between the first and second openings:
   a. a plurality of circularly spaced electromagnetic coils fixed to said body around said first opening, the coils adapted to be connected to electrical power supply means in the pump mode and to electrical energy receiving means in the generator mode;
   b. a rotatably located circular conductive rotor having a central aperture therethrough;
   c. a circular impeller having a central aperture therethrough fixed to said rotor, said impeller having a plurality of spaced narrow radial blades extending transversely away from said rotor; and
   d. a diffuser fixed to said body, said diffuser having a circular plate spaced adjacent the impeller blades and a plurality of spaced curved radial vanes secured transversely to the plate to extend away from the impeller;
   the power supply means adapted to produce a travelling electromagnetic wave which rotates about said central axis adjacent said coils to cut conductive paths of said rotor when the rotor has angular motion relative to said travelling electromagnetic wave,
   the device providing a reversible fluid flow path therethrough between the first and second openings having a first axial portion, a radial outward portion, a radial inward portion and a second axial portion.

2. An energy conversion device as claimed in claim 1 wherein the body defines a circumferential space around the peripheries of the impeller blades and diffuser vanes, thereby providing a transitional area between the radial outward portion and the radial inward portion of the fluid flow path.

3. An energy conversion device as claimed in claim 2 further including at least one magnetic dipole means fixed to the rotor and adapted upon rotation of the rotor to interact by means of magnetic flux linkage with the stationary coils.

4. An energy conversion device as claimed in claim 2 wherein the diffuser vanes are radially semicircular and the radial outward and radial inward portions of the fluid flow path is substantially semicircular.

5. An energy conversion device as claimed in claim 3 wherein the diffuser vanes are radially semicircular and the radial outward and radial inward portions so the fluid flow path is substantially semicircular.

6. An energy conversion device as claimed in claim 2 wherein the rotor has a plurality of radial spokes interconnected at inner and outer ends thereof.

7. An energy conversion device as claimed in claim 6 wherein the rotor has a plurality of cutouts defined between the radial spokes, the cutouts being filled with ferromagnetic material.

8. An energy conversion device as claimed in claim 3 wherein the rotor has a plurality of radial spokes interconnected at inner and outer ends thereof.

9. An energy conversion device as claimed in claim 8 wherein the rotor has a plurality of cutouts defined between the radial spokes, the cutouts being filled with ferromagnetic material.

* * * * *